(19.)
A. FOUBERT.
Improvement in Apparatus for Cooling Beer.
No. 122,592.                          Patented Jan. 9, 1872.
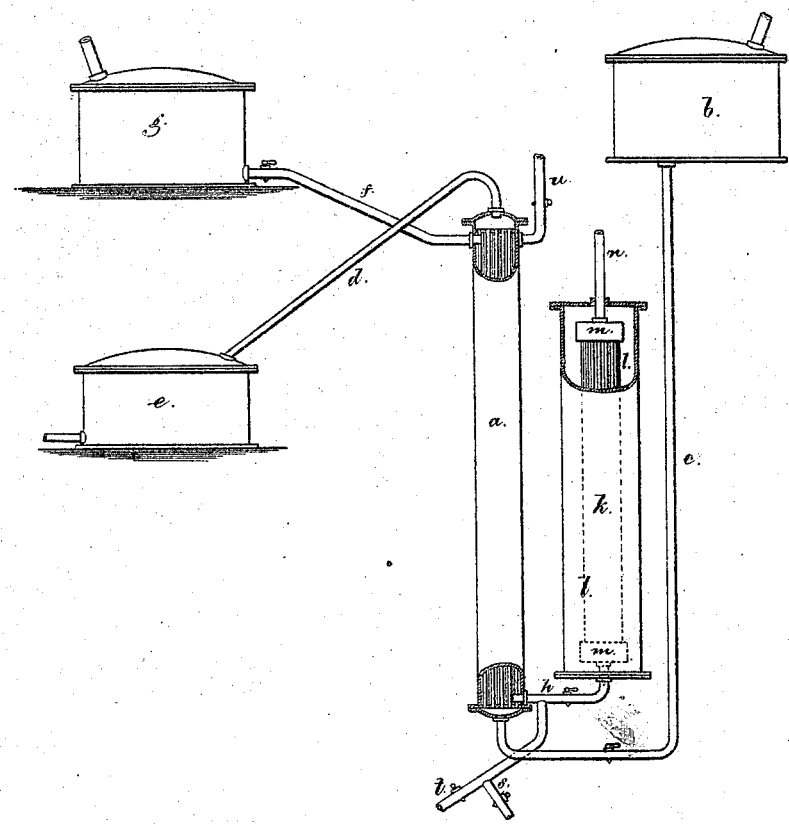

UNITED STATES PATENT OFFICE.

ANDRE FOUBERT, OF BUFFALO, NEW YORK.

IMPROVEMENT IN APPARATUS FOR COOLING BEER.

Specification forming part of Letters Patent No. 122,592, dated January 9, 1872.

*To all whom it may concern:*

Be it known that I, ANDRE FOUBERT, of Buffalo, in the county of Erie and State of New York, have invented an Improvement in Apparatus for Cooling Beer; and the following is declared to be a correct description thereof.

Before my invention beer had been cooled by exposure to the atmosphere in large shallow vats and also by being allowed to run over the outside of ranges of tubes containing water. In the first-named case the cooling has not been sufficiently rapid to prevent injurious fermentation, especially in some conditions of atmosphere. In the latter case the beer is exposed to the atmosphere, and there is considerable loss by evaporation, and the beer loses its flavor. My present invention is to prevent exposure to the atmosphere and at the same time effect the cooling operation with sufficient rapidity to prevent injurious fermentation. My improvement consists in a compound refrigerating apparatus in which the beer passes through a closed vessel filled with pipes in which the cooling water runs, and from this closed vessel the beer passes through a series of pipes in a refrigerator, so as to be reduced by water or ice in that refrigerator to the desired temperature.

In the drawing I have represented my improvement by a vertical section of the apparatus.

The cooling-vessel $a$ is made of a vertical cylinder containing double heads and numerous vertical pipes of small size and placed close together, the pipes opening at their ends through the inner heads, so that the cooling water supplied from the tank $b$ will run, by the pipe $e$, through these tubes and pass up by the elevated pipe $d$ to the vat $e$, where the warmed water can be reserved for use in other operations. The beer is supplied by the pipe $f$ and runs from the vat $g$ into the upper part of the cooler $a$, passing gradually downward and running away, by the pipe $h$, to the refrigerator $k$. The pipes $c$ $f$ are provided with cocks that should have divisions or degrees marked upon them so that they can be opened the proper amount in order that the cooling-water may be supplied in the proper proportion to effect the cooling of the beer that runs through the apparatus to the required temperature; and I remark that all portions of this apparatus that come in contact with the beer should be tinned to prevent any injury to the same from the copper or other metal made use of for the vessels and pipes. Within the refrigerator $k$ there is a vertical group of pipes, $l$, opening at their upper and lower ends into the chambers $m$, the lower one being connected with the pipe $h$ and the upper one with delivery-pipe $n$, that leads to any suitable receptacle. The refrigerator $k$ may contain water or ice, as required, and a pipe and cock at $s$ may be provided to draw off the beer, if it is not desired to pass all of it through the apparatus, or for emptying the vessel $a$ and pipes $l$. The pipe and cock at $t$ can be used for admitting steam or hot water for cleansing the vessels $a$ $k$, and the pipe and cock $u$ serves as a blow-off for the vessel $a$.

I claim as my invention—

The cooler $a$, constructed as specified, and combined with the vertical group of pipes $l$ in the refrigerator $k$, the parts being constructed and connected, as and for the purposes set forth.

Signed by me this 9th day of November, A. D. 1871.

A. FOUBERT.

Witnesses:
  N. OTTENOT,
  A. RUFFEL.